Jan. 13, 1970     D. E. STEIN     3,489,169
LIQUID LEVEL CONTROL APPARATUS
Filed Oct. 17, 1966     2 Sheets-Sheet 1

INVENTOR
DONALD E. STEIN

BY

ATTORNEYS.

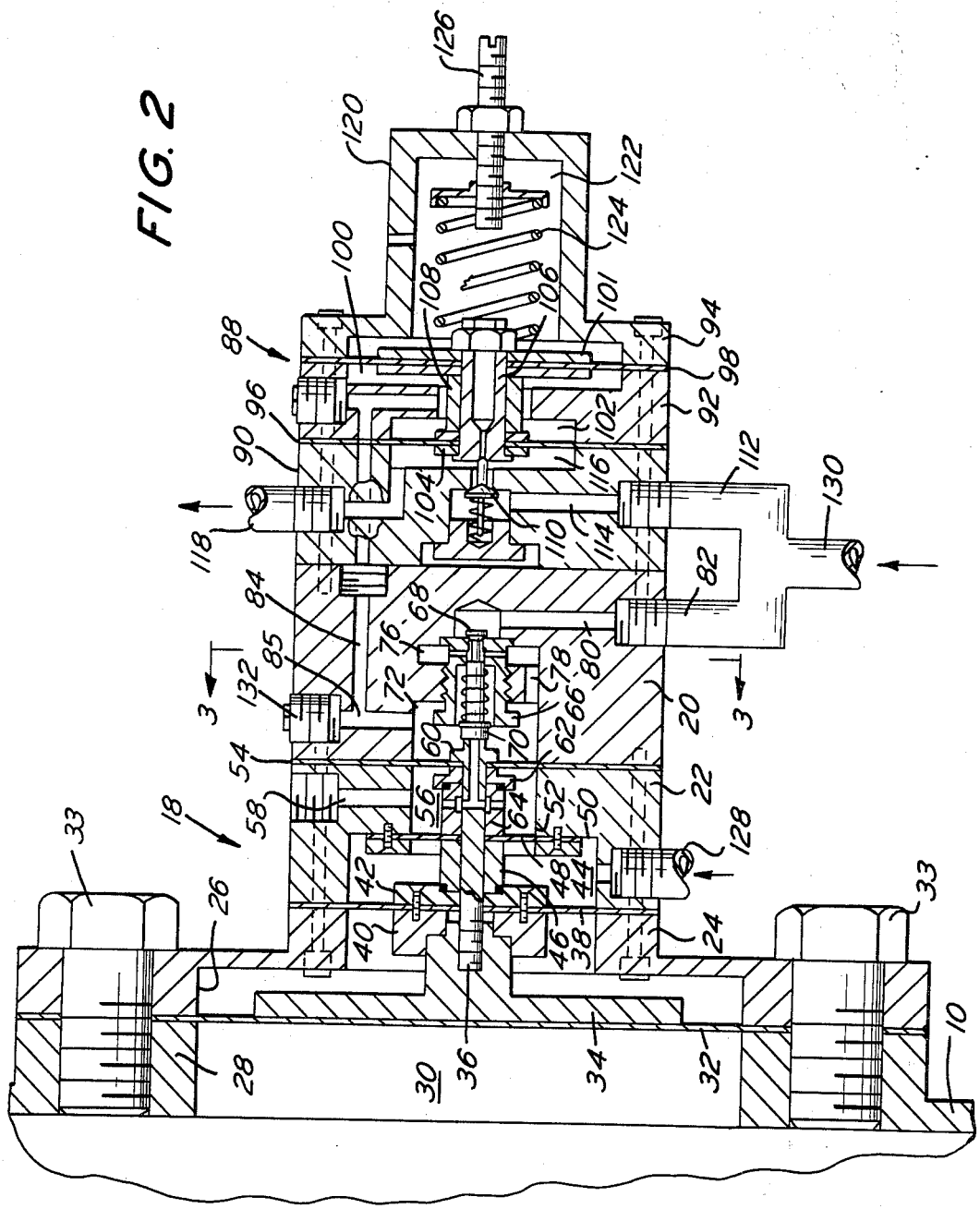
INVENTOR
DONALD E. STEIN

United States Patent Office 3,489,169
Patented Jan. 13, 1970

3,489,169
LIQUID LEVEL CONTROL APPARATUS
Donald E. Stein, Millville, N.J., assignor to Kane Air Scale Company, Glassboro, N.J., a corporation of New Jersey
Filed Oct. 17, 1966, Ser. No. 587,300
Int. Cl. F16k 21/18; F17d 3/00; E03b 11/00
U.S. Cl. 137—403
9 Claims

ABSTRACT OF THE DISCLOSURE

Apparatus is disclosed for maintaining liquid level in a vessel within a predetermined range. The apparatus is directly responsive to liquid pressure head. A reversing valve is provided for rendering the apparatus inversely proportional to pressure head in the vessel. A pressurized tare weight chamber is provided between the pressure responsive member and the net load chamber. A valve controls introduction of pressurized air from a source independent of the pressure on the pressure responsive member into the net load chamber in response to movement of the pressure responsive member.

---

This invention relates to liquid level control apparatus, and more particularly, for apparatus for maintaining the level of a liquid within a vessel within a predetermined range.

The apparatus of the present invention is pneumatically operated and constructed in a manner so as to transmit a signal to a valve to control introduction of liquid into a vessel as the liquid is being removed from the vessel. The apparatus of the present invention is simple, inexpensive, and reliable. The apparatus of the present invention does not utilize levers, nozzles, or other similar devices which have been proposed heretofore. The apparatus of the present invention can be of the direct controlling type or of the indirect controlling type.

When the apparatus of the present invention is of the direct controlling type, the valve controlling the inflow of liquid into the vessel is moved to a closed position in response to a maximum signal. When the apparatus of the present invention is of the indirect type, the valve controlling inflow of liquid into the vessel is moved to a closed position in response to a minimum signal. Conversion from the direct type to the indirect type is readily accomplished by attaching the reversing valve to the liquid level regulator. By merely removing a few bolts, the apparatus may be converted from the indirect type to the direct type or vice versa.

It is an object of the present invention to provide a novel pneumatic liquid level control apparatus.

It is an object of the present invention to provide a pneumatic liquid level control device which may be of the direct type.

It is another object of the present invention to provide a liquid level control device which is pneumatically operated and of the indirect type.

It is another object of the present invention to provide a pneumatic liquid level control apparatus which can be readily converted from direct to indirect applications.

It is another object of the present invention to provide a pneumatic liquid level control apparatus which is relatively simple, less expensive than those proposed heretofore, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIGURE 2 is a sectional view of the liquid level regulator.

Figure 1:
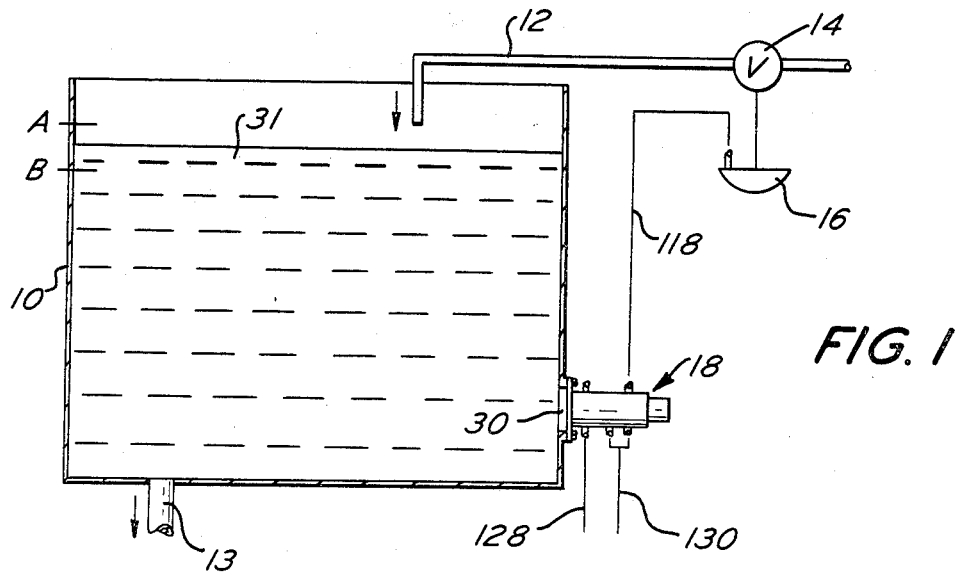
FIGURE 1 is a schematic illustration of a vessel having the liquid level regulator of the present invention attached thereto for controlling the inflow of liquid into the vessel.

Referring to the drawing in detail, wherein like numerals indicate like elements, there is shown a vessel having an upright wall 10, an open top, and a conduit 12 for introducing liquid into the vessel. Conduit 12 is provided with a control valve 14 having a diaphragm actuator 16. A liquid level regulator is connected to the wall 10 and coupled to the actuator 16 as will be made clear hereinafter.

Referring to FIGURE 2, it will be noted that the regulator 18 includes housing sections 20, 22 and 24 coupled together by bolts shown in phantom. Housing section 24 is provided with a radially outwardly directed flange 25 and an axially directed rim 26. The rim 26 overlies a flange 28 on the wall 10. Flange 28 defines a hole 30 in the wall 10 in communication with the liquid 31 within the vessel. Rim 26 is connected to the flange 28 by a plurality of bolts 33.

A diaphragm 32 has its outer peripheral portion clamped between the flange 28 and rim 26. Diaphragm 32 is preferably constructed of material which is compatible with the liquid 31 so as not to be corroded by the same. For most liquids, the diaphragm 32 may be made from a nylon reinforced polymeric material. The central portion of the diaphragm 32 is in contact with an end face of an anvil 34. Anvil 34 has a central boss to which is threadedly coupled a stem 36.

A diaphragm 38 has its outer peripheral portion clamped between the housing sections 22 and 24. Plates 40 and 42 are each clamped to one side of a central portion of the diaphragm 38. Each of the plates 40 and 42 are provided with a central bore through which the stem 36 extends for reciprocal relative movement. The bore on the plate 40 is countersunk and receives a shoulder on the boss of anvil 34.

A tare weight chamber 44 is provided within the housing section 22. One side of chamber 44 is defined by diaphragm 38 and its plate 42. The opposite side of chamber 44 is defined by a shoulder 50 on housing section 22 and a diaphragm 48. Diaphragm 48 has its outer peripheral portion clamped to the shoulder 50. A sleeve 46 extends between the diaphragm 48 and the plate 42. Sleeve 46 is provided with a central bore which reciprocally receives the stem 36.

The housing section 22 is provided with a central bore 52 within which is provided a vent chamber 56 adapted to communicate with atmosphere by way of radial passage 58. One side of chamber 56 is defined by the diaphragm 48. The opposite side of chamber 56 is defined by diaphragm 54. Diaphragm 54 has its outer peripheral portion clamped between the housing sections 20 and 22.

The stem 36 is provided with a radially outwardly directed flange 60 adjacent its end which is remote from the anvil 34. Flange 60 overlies a central portion of the diaphragm 54 on a side thereof remote from the chamber 56. It will be noted that stem 36 extends through a central aperture in the diaphragms 48 and 54. A plate 62 overlies a central portion of the diaphragm 54 on a side of the diaphragm 54 which is exposed to chamber 56. A sleeve 64 extends between plate 62 and diaphragm 48 within chamber 56. Stem 36 is reciprocally disposed within a central bore of the sleeve 64.

The stem 36 is provided with an axial bore which communicates with radial passages in the sleeve 64. The inner peripheral surface of the sleeve 64 is provided with a circumferential groove to facilitate constant communication between the axial bore of stem 36, the radial passages in sleeve 64, and the vent chamber 56.

Figure 3:
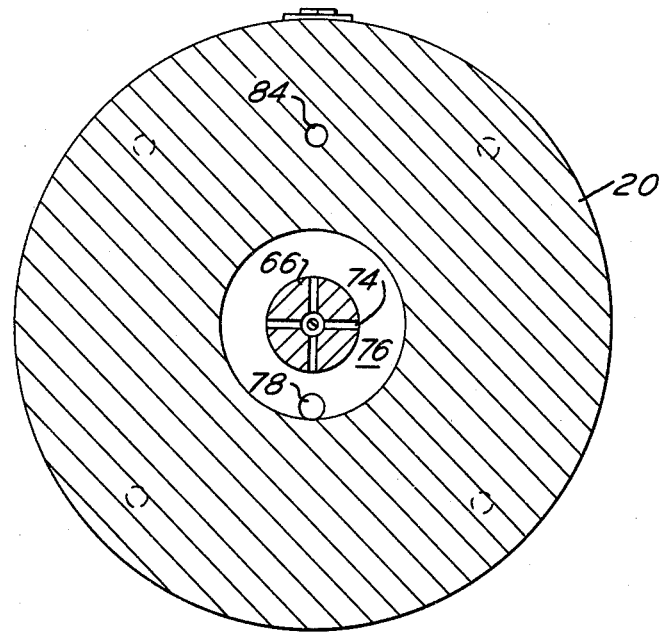
FIGURE 3 is a sectional view taken along the line 3—3 in FIGURE 2.

A valve body 66 has its outer periphery threadedly coupled to an axial bore in the housing section 20. The valve body 66 is provided with a central bore having a valve seat at the right-hand end thereof in FIGURE 2. A valve member 68 cooperates with the valve seat and has a stem 70 extending through the central bore of the valve seat. A spring within the housing 66 biases the valve member 68 into contact with the valve seat. As shown more clearly in FIGURES 2 and 3, the valve body 66 is provided with radial passages 74 which provide communication between the central bore thereof and a chamber 76 within the housing section 20. Chamber 76 is in open communication with chamber 72 by way of a passage 78. Chamber 72 may be referred to as a net load chamber. Valve member 68 controls the flow of air under pressure from conduit 82, passage 80, to the chamber 76. The pressurized air exits from the net load chamber 72 by way of passage 84 or passage 85. Either one of these passages is alternatively closed by plug 132. When the signal transmitted to the diaphragm actuator 16 for the valve 14 is of the direct type, plug 132 will close passage 84 and passage 85 will be connected directly to the diaphragm actuator 16.

For purposes of illustration, plug 132 closes passage 85 thereby enabling the signal in the form of pneumatic pressure to be transmitted through passage 84 to a reversing valve designated generally as 88. The reversing valve 88 includes a plurality of housing sections 90, 92 and 94, all coupled to the housing section 20 by bolts shown in phantom. A diaphragm 96 has its outer peripheral portion clamped between sections 90 and 92. A diaphragm 98 has its outer peripheral portion clamped between the housing sections 92 and 94. Passage 84 communicates directly with chambers 100 and 102 within the housing section 92.

Plates 101 are clamped to the central portion of diaphragm 98. Plates 104 are clamped to opposite sides of a central portion on the diaphragm 96. The diameter of plates 104 is less than the diameter of plates 101. The surface area of diaphragm 98 and plate 101 exposed to chamber 100 is greater than the corresponding surface area of diaphragm 96 and plate 104 exposed to the chamber 102.

A hollow tube 106 having a central bleed bore extends through the diaphragms 96 and 98 and the plates attached to said diaphragms. A sleeve 108 surrounds the tube 106 and extends between the plate 101 in chamber 100 and the plate 104 in chamber 102. One end of the tube 106 has a radially outwardly directed flange overlying the plate 104. A bolt is threadedly coupled to the tube 106 and overlies the plate 101 on the diaphragm 98 so as to retain the elements in an assembled relationship as illustrated in FIGURE 2.

A valve head 110 provided in an inlet chamber within housing section 90 controls flow of pressurized air from conduit 112, through passage 114 to the chamber 116. The chamber 116 is on the opposite side of diaphragm 96 from the chamber 102. Chamber 116 may be referred to as the net load chamber when the regulator 18 includes the reversing valve 88. In the absence of regulator valve 88, chamber 72 is the net load chamber. Net load chamber 116 communicates with the underside of the diaphragm actuator 16 by way of conduit 118. When plug 132 closes passage 84, conduit 118 can be threadedly coupled so as to communicate with passage 85.

The housing section 94 is provided with a central cup portion 120. The interior of the cup portion 120 defines a chamber 122 which is vented to atmosphere. A spring 124 within chamber 122 has one end abutting the plate 101. The other end of the spring is coupled to a plate mounted on a threaded actuator 126 which is readily adjustable to control the bias of the spring tending to move the tube 106 to the left in FIGURE 2. Pressurized air may be communicated to the tare weight chamber by way of conduit 128. Pressurized air may be communicated to the conduits 82 and 112 by way of conduit 130.

Let it be assumed that it is desired to maintain the level of the liquid 31 within the vessel between the upper limit defined as A and the lower limit defined as B. When the level of liquid 31 reaches level A, the pressure of the liquid head acting on the diaphragm 32 moves the anvil and stem 36 to the right in FIGURE 2, thereby moving the valve member 68 off its seat due to contact between the ends of stem 36 and the stem 70. Pressure from conduit 82 then enters the chamber 72 and reacts against the diaphragm 54 and flange 60 to move the stem 36 and anvil 34 to the left in FIGURE 2. When the stem 36 is moved to the left in FIGURE 2 a sufficient distance, the spring surrounding stem 70 will move the valve member 68 and cause it to contact the valve seat. The pressure that then exists in chamber 72 will be sufficient to cause the diaphragm actuator 16 to close the valve 14.

When the level of the liquid falls below A, due to flow out of the tank, the liquid head acting on diaphragm 32 drops allowing stem 36 and seat 70 to separate so that the air flow out of chamber 72 increases causing the output pressure to change to reopen valve 14. Air bleeds out of chamber 72 via the axial bore in the stem 36 and the radial passages in sleeve 64, into chamber 56, then vented by way of passage 58. If the tank level continues to drop due to increased outflow through conduit 13 the control signal to valve 14 will change proportionally until valve 14 is full open at level B. The reverse takes place when the outflow through conduit 13 decreases and valve 14 will be closed at level A.

Chamber 44 is a net tare weight chamber. The pressure introduced into chamber 44 is at a pressure which balances the pressure head on the diaphragm 32 at a liquid level corresponding to level B.

In certain processes, it is desired to provide an actuator for the valve 14 which closes the valve when subjected to a minimum pressure and opens the valve when subjected to a maximum pressure. Thus, in such systems and processes, it is desirable to provide a protective device in the event that there is a failure in the pneumatic pressure supply system. For example, if liquid 31 is an acid, it would be desirable to prevent overflowing of the vessel in the event that pneumatic pressure from conduit 82 were to develop a leak. In such event, it is desirable to provide the reversing valve 88 which may be readily coupled to the housing section 20 as illustrated after first switching the position of plug 132.

When the reversing valve 88 is utilized, conduit 118 is connected to the diaphragm actuator 16 on the opposite side from the position when valve 88 is not utilized. Due to the ratio of the diaphragms 96 and 98 and the respective plates forming a part of the chambers 102 and 100 respectively, the pressure from chamber 72 transmitted by way of passage 84 tends to move the diaphragms 96 and 98 to the right in FIGURE 2. However, the combination of the pressure on diaphragm 96 within chamber 102 plus the bias of spring 124 exceeds the pressure on diaphragm 98 within chamber 100. Accordingly, the tube 106 contacts the extension on valve member 110 which in turn closes the bleed passage through tube 106 and unseats the valve member 110. Pressure from conduit 112 enters chamber 116 and is transmitted by way of conduit 118 to the diaphragm actuator 16. When the liquid level in the vessel reaches level A, the pressure in chamber 116 is at a minimum. When the liqiud level in the vessel is at level B, the pressure in chamber 116 is at a maximum. This is best explained by the following.

The pressure transmitted through conduit 118 is equal to $PA_1 + K - PA_2$, wherein P is the pressure in p.s.i. in chambers 100 and 102, $A_1$ is the surface area on diaphragm 96 exposed to chamber 102, $A_2$ is the surface area on diaphragm 98 exposed to chamber 100, and K is the force of spring 124. If it is assumed that $P=3$ p.s.i., $A_1=1$, $A_2=2$, and $K=18$, the output pressure will be 15 p.s.i. Now if we increase the P to 15, and utilizing the above formula, it will be seen that the output pressure for closing the valve will be 3 p.s.i. The effect on valve 14 of varying P from 3 and 15 p.s.i. is the opposite to those described above in connection with a direct type regulator. Thus, as described above in the absence of valve 88, 3 p.s.i. would have opened valve 14 and 15 p.s.i. would have closed valve 14.

When the pressure within chamber 116 exceeds a predetermined maximum, the tube 106 will move to the right away from the extension on the valve member 110, thereby bleeding excess pressure through the central bleed passage in tube 106, into chamber 122, and then out through the vent passage in the cup portion 120. The above analysis assumes that the spring pressure of spring 124 remains constant. While the spring pressure is adjustable by way of actuator 126, once the actuator 126 is preset, the pressure should not be adjusted thereafter unless the desired limits are changed or the range A–B is desired to be changed. Since a piston could perform the function of diaphragm 32, this diaphragm may be referred to as pressure responsive member.

I claim:

1. A control apparatus comprising a housing having an exposed pressure responsive member at one end thereof, an anvil coupled to the member and responsive to movement thereof, a stem connected to the anvil and extending in a direction away from the member, means defining a pressurized tare weight chamber within the housing and surrounding the anvil stem for balancing out tare weight, means defining a net load chamber in the housing, a pressure source independent of the pressure to which said member is to be exposed, a valve for controlling introduction of pressurized air from said source into the net load chamber in response to reciprocation of the anvil stem in a first direction generally perpendicular to the anvil and for interrupting introduction of pressurized air into the net load chamber in response to reciprocation of the anvil stem in a second direction opposite to the first direction, said tare weight chamber being between the net load chamber and the anvil, and means for venting the net load chamber in response to movement of the anvil stem in said second direction, and passage means in said housing for communicating the pressure of the net load chamber to a control device.

2. Apparatus in accordance with claim 1 including a vent chamber in said housing between the net load chamber and the tare weight chamber, and means associated with said stem for providing communication between the net load chamber and the vent chamber when said stem moves in said second direction beyond a predetermined point effected by the pressure in the net load chamber being greater than a desired maximum.

3. Apparatus in accordance with claim 2 wherein said last-mentioned means includes axial and radial passages in said stem which exit on opposite sides of a diaphragm separating the net load chamber and the vent chamber, and said member being a diaphragm.

4. Apparatus in accordance with claim 1 wherein said valve is centrally located within said housing in line with said stem, a portion of said valve being in contact with said stem when the stem is moved in said first direction, and means for biasing the valve to a closed position when the stem moves in said second direction.

5. Apparatus in accordance with claim 1 including a reversing valve coupled to said net load chamber, said reversing valve including means for transmitting a pneumatic signal which is at a minimum when said net load chamber is at a maximum and for transmitting a pneumatic signal which is at a maximum when said net load chamber pressure is at a minimum.

6. Apparatus comprising a vessel, a conduit for introducing a liquid into the vessel, a control apparatus coupled to a wall of said vessel for maintaining liquid level in the vessel between a predetermined upper and lower limit, said apparatus including a housing having a diaphragm at one end thereof exposed to the interior of said vessel and adapted to contact the liquid, an anvil coupled to the diaphragm and responsive to movement thereof as a function of only the pressure head in the vessel, a stem connected to the anvil, means defining a tare weight chamber within the housing surrounding the anvil stem for balancing out the tare weight of the minimum liquid level within the vessel, said stem extending through said tare weight chamber, means including a diaphragm connected to said stem and defining a net load chamber in the housing, a valve for controlling introduction of pressurized gas into the net load chamber in response to reciprocation of the anvil stem in a first direction and for interrupting the introduction of pressurized gas into the net load chamber in response to movement of the anvil stem in a second direction opposite to the first direction, said tare weight chamber being between said net load chamber and said anvil, means for venting the net load chamber in response to movement of the anvil stem in said second direction beyond a predetermined point, a control member in said conduit for controlling the flow therethrough, and conduit means connecting an actuator for said control member with said net load chamber whereby the control valve actuator responds to the pressure in said net load chamber.

7. A control apparatus in accordance with claim 6 including a reversing valve coupled to said net load chamber, said reversing valve including means for transmitting a pneumatic signal which is at a minimum when said net load chamber pressure is at a maximum and for transmitting a pneumatic signal which is at a maximum when said net load chamber pressure is at a minimum.

8. Apparatus in accordance with claim 7 wherein said last-mentioned means includes a balancing chamber communicating with said net load chamber, said balancing chamber being defined at opposite ends by diaphragms having different amounts of surface area exposed to the balancing chamber, and an adjustable spring means coupled to one of the diaphragms partially defining the balancing chamber.

9. Apparatus in accordance with claim 8 wherein said last-mentioned means includes an outlet chamber in said reversing valve communicating with said first-mentioned conduit means, conduit means in said reversing valve for introducing pressurized air into the outlet chamber, a valve for controlling flow of pressurized air into the outlet chamber, said last-mentioned valve being coupled to and being responsive to movement of said last-mentioned diaphragms, and said spring means tending to move said last-mentioned valve to an open position.

References Cited

UNITED STATES PATENTS

| | | | |
|---|---|---|---|
| 2,781,770 | 2/1957 | Sutton | 137—86 X |
| 3,150,675 | 9/1964 | Phillips | 137—85 |
| 2,232,219 | 2/1941 | Dueringer | 137—84 |
| 2,719,534 | 10/1955 | Williams | 137—84 |
| 2,737,973 | 3/1956 | Kimmel | 137—84 X |
| 2,804,877 | 9/1957 | Rosenberger | 137—86 X |
| 3,003,475 | 10/1961 | Rouvalis | 137—85 X |
| 3,252,471 | 5/1966 | Olson | 137—270 X |

WILLIAM F. O'DEA, Primary Examiner

DAVID R. MATTHEWS, Assistant Examiner